United States Patent
Mandal et al.

(10) Patent No.: US 10,530,581 B2
(45) Date of Patent: Jan. 7, 2020

(54) AUTHENTICATED BROADCAST ENCRYPTION

(71) Applicant: FUJITSU LIMITED, Kawasaki-shi, Kanagawa (JP)

(72) Inventors: Avradip Mandal, Sunnyvale, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 15/699,994

(22) Filed: Sep. 8, 2017

(65) Prior Publication Data

US 2019/0081790 A1 Mar. 14, 2019

(51) Int. Cl.
| | |
|---|---|
| *H04L 9/32* | (2006.01) |
| *H04L 9/30* | (2006.01) |
| *H04L 29/06* | (2006.01) |
| *H04W 12/06* | (2009.01) |
| *H04W 12/02* | (2009.01) |
| *H04W 12/04* | (2009.01) |

(52) U.S. Cl.
CPC ............ *H04L 9/3218* (2013.01); *H04L 9/30* (2013.01); *H04L 9/321* (2013.01); *H04L 63/0428* (2013.01); *H04W 12/02* (2013.01); *H04W 12/04* (2013.01); *H04W 12/06* (2013.01); *H04L 2209/601* (2013.01); *H04L 2209/80* (2013.01)

(58) Field of Classification Search
CPC ... H04L 9/3218; H04L 63/0428; H04L 9/321; H04L 9/30; H04L 2209/80; H04L 2209/601; H04W 12/06; H04W 12/02; H04W 12/04
See application file for complete search history.

(56) References Cited

U.S. PATENT DOCUMENTS

| | | | | |
|---|---|---|---|---|
| 9,065,638 B2 * | 6/2015 | Kamijoh | ............. | G06F 21/6209 |
| 2002/0038420 A1 * | 3/2002 | Collins | ................. | H04L 9/3263 713/156 |

(Continued)

OTHER PUBLICATIONS

Boneh, Dan, et al. (2005). "Collusion Resistant Broadcast Encryption with Short Ciphertexts and Private Keys". Annual International Cryptology Conference. Springer Berlin Heidelberg.

(Continued)

*Primary Examiner* — Mohammed Waliullah
(74) *Attorney, Agent, or Firm* — Maschoff Brennan

(57) ABSTRACT

A method may include obtaining a common reference string. The method may further include obtaining a first public key for a first party and a second public key for a second party. The method may also include obtaining a first encrypted message, the first encrypted message encrypted using the first public key. The method may further include obtaining a second encrypted message, the second encrypted message encrypted using the second public key. The method may also include obtaining a proof. The method may further include verifying, using the proof, the common reference string, the first public key, and the second public key, that a decryption of the first encrypted message and a decryption of the second encrypted message are equivalent without decrypting the first encrypted message and without decrypting the second encrypted message.

20 Claims, 5 Drawing Sheets

(56) References Cited

U.S. PATENT DOCUMENTS

2012/0294440 A1* 11/2012 Little .................... H04L 9/0841
  380/44
2016/0219045 A1* 7/2016 Toedter .................. H04L 63/12

OTHER PUBLICATIONS

Groth, Jens, et al. (2008). "Efficient Non-interactive Proof Systems for Bilinear Groups". Annual International Conference on the Theory and Applications of Cryptographic Techniques. Springer Berlin Heidelberg.

ElGamal, Taher. (Jul. 1985). "A Public Key Cryptosystem and a Signature Scheme Based on Discrete Logarithms". IEEE Transactions on Information Theory, vol. IT-31, No. 4, pp. 469-472.

* cited by examiner

AUTHENTICATED BROADCAST ENCRYPTION

FIELD

The embodiments discussed in the present disclosure are related to authenticated broadcast encryption.

BACKGROUND

For many applications, having the ability to perform confidential transactions where third or nonessential parties cannot see the details is often beneficial. When a transaction involves more than two parties, this may be difficult to achieve. Current cryptographic solutions often do not provide practical answers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a common reference string. The method may further include obtaining a first public key for a first party and a second public key for a second party. The method may also include obtaining a first encrypted message, the first encrypted message encrypted using the first public key. The method may further include obtaining a second encrypted message, the second encrypted message encrypted using the second public key. The method may also include obtaining a proof. The method may further include verifying, using the proof, the common reference string, the first public key, and the second public key, that a decryption of the first encrypted message and a decryption of the second encrypted message are equivalent without decrypting the first encrypted message and without decrypting the second encrypted message.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
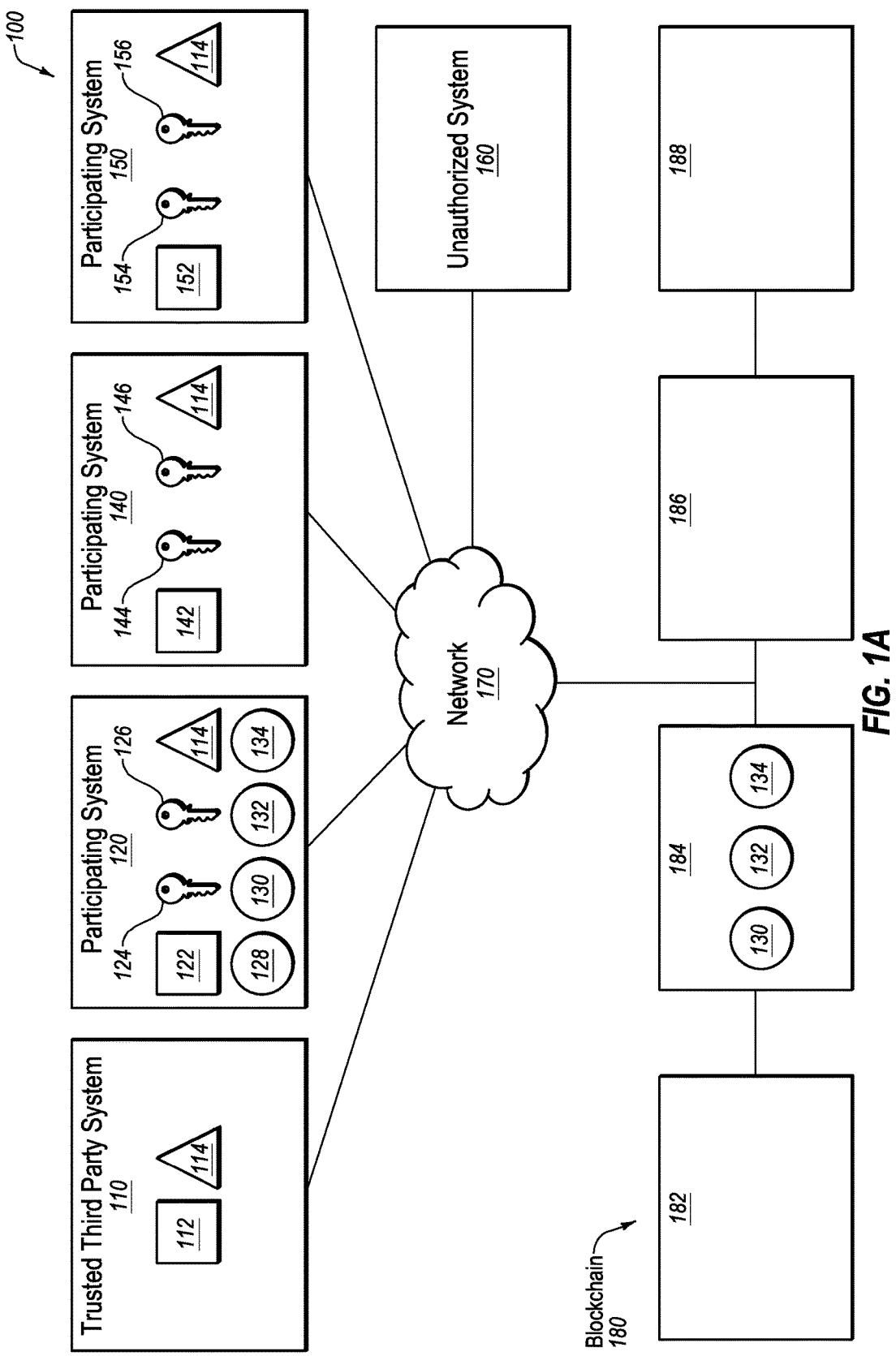
FIG. 1A is a diagram representing an example environment related to authenticated broadcast encryption.

Some embodiments described in the present disclosure relate to methods and systems of authenticated broadcast encryption. Many transactions are performed in a confidential manner such that third parties, nonessential parties, or unauthorized parties may not see the details of the transaction. For example, some financial transactions are performed in a confidential manner without details of the transaction being available to non-participating parties. When a transaction involves more than two parties, providing encrypted details of the transaction while also allowing each party to verify that each other party has received the same encrypted details may be complicated or inefficient. Current cryptographic solutions often do not provide practical solutions.

Authenticated broadcast encryption of the present disclosure allows each party to a transaction to verify that multiple encrypted messages encrypted with multiple public encryption keys correspond to the same message. In some embodiments, this may facilitate the posting of one or more encrypted transactions on blockchains privately so that multiple other users may decrypt and read the transaction and also verify that the transaction is correct without allowing unauthorized parties to determine details of the transaction. Current blockchains may be unable to perform private or confidential transactions or may perform them inefficiently.

According to one or more embodiments described in the present disclosure, three or more parties may engage in a confidential transaction. One of the parties to the transaction may obtain the public encryption keys of the other parties to the transaction. The party may encrypt the transaction details for each of the other parties to the transaction using the public encryption keys of the other parties to the transaction. In addition, the party may provide a proof that the messages encrypted using each public encryption key all correspond to the same message. The encrypted messages may be determined to decrypt to the same message without decrypting the encrypted messages using the proof. Unauthorized systems may only be able to determine that the messages encrypted with different public encryption keys correspond to the same message and may not be able to determine the contents of the message.

Alternatively or additionally, in some embodiments, three or more parties may be participants in a blockchain network. In these and other embodiments, messages encrypted using the public encryption keys of each of the parties to a transaction along with a proof that the encrypted messages correspond to the same message may be posted to the blockchain. Further, participants of the blockchain who are not parties to the transaction may be able to verify that the encrypted messages correspond to the same message using the proof but may not be able to decrypt the encrypted messages. As such, the details related to the transaction may be hidden from the other participants in the blockchain while also allowing the parties who are part of the transaction to use the blockchain to communicate information related to the transaction. In these or other embodiments, the other participants may verify that the messages related to the transaction are equivalent. Additionally or alternatively, the parties to the transaction may be able to verify that information included in the encrypted messages that are posted to the blockchain is equivalent to help improve trust associated with the transaction. As such, authenticated broadcast encryption may improve the efficiency of generating encrypted messages by providing a process and system which may allow third parties to verify the equivalence of encrypted messages without being able to determine the contents of the encrypted messages.

In the present disclosure, reference to information being equivalent or decryption of encrypted messages being equivalent may refer to messages that are largely equivalent or that do not differ in any material terms. For example, in some embodiments, the decryptions of two encrypted messages may be equivalent even if they differ in terms of a salutation, creation date, or other minor details. For example, two messages that differs only in terms of the addressee and not in terms of the content of the messages may be considered equivalent messages. For example, text of two messages other than a salutation may be encrypted. The salutation of each message may be different. The messages may be considered equivalent messages based on the decryptions of the encrypted text of the two messages being equivalent. Additionally, reference to an encrypted message decrypting to a message may refer to the decrypting outputting the message in a manner that allows for the message to be read and understood. Further, reference to a transaction may include any agreement between parties, any message between parties, any communication between parties, any data that may be communicated between multiple parties, or any other data. For example, in some embodiments, the transaction may include a picture, a video, an audio recording, or any other multimedia file. For example, in some embodiments, the transaction may include a message, including a text document, created by one of the parties and sent to the other parties. In some embodiments, the transaction may include a letter sent by one of the parties to the other parties or a letter received by the parties. In some embodiments, the transaction may include a contract between multiple parties. The transaction may include the terms of the contract, including the expected performance of each party to the contract. In some embodiments, the transaction may include a financial transaction. For example, the transaction may include details concerning the price, quantity, type, or other conditions related to performance of the financial transaction by one or more of the parties to the transaction.

Furthermore, some algorithms and processes in the present disclosure also use additional randomness during the execution of the algorithm. For example, algorithms and processes in the present disclosure may use randomness as an input. For example, encryption algorithms may use randomness as an input. Encrypting one message twice using a single public key may not generate the same encrypted message both times. Alternatively, other algorithms and processes in the present disclosure may use randomness.

Embodiments of the present disclosure are explained with reference to the accompanying drawings.

FIG. 1A is a diagram representing an example environment 100 related to authenticated broadcast encryption, arranged in accordance with at least one embodiment described in the present disclosure. The environment 100 may include a trusted third party system 110, a first participating system 120, a second participating system 140, a third participating system 150, an unauthorized system 160, a network 170, and a blockchain 180.

The network 170 may be configured to communicatively couple the trusted third party system 110, the first participating system 120, the second participating system 140, the third participating system 150, the unauthorized system 160, and the blockchain 180. In some embodiments, the network 170 may be any network or configuration of networks configured to send and receive communications between systems and devices. In some embodiments, the network 170 may include a conventional type network, a wired or wireless network, and may have numerous different configurations. In some embodiments, the network 170 may also be coupled to or may include portions of a telecommunications network, including telephone lines such as a public switch telephone network (PSTN) line, for sending data in a variety of different communication protocols, such as a protocols used by a plain old telephone system (POTS). Examples of the network 170 include but not limited to the Internet or an intranet.

Each of the trusted third party system 110, the first participating system 120, the second participating system 140, and the third participating system 150 may be any electronic or digital computing device. For example, each of the trusted third party system 110, the first participating system 120, the second participating system 140, and the third participating system 150 may include a desktop computer, a laptop computer, a smartphone, a mobile phone, a tablet computer, a telephone, a phone console, or any other computing device. In some embodiments, the trusted third party system 110, the first participating system 120, the second participating system 140, and the third participating system 150 may each include a computing system, such as the computing systems 112, 122, 142, and 152, respectively, which are configured to perform operations as described in this disclosure, among other operations. The computing systems 112, 122, 142, and 152 may be similar to the computing system 200 described below with respect to FIG. 2. In some embodiments, the trusted third party system 110, the first participating system 120, the second participating system 140, and the third participating system 150 may include computer-readable instructions that are configured to be executed by the trusted third party system 110, the first participating system 120, the second participating system 140, and the third participating system 150 to perform operations described in this disclosure.

In some embodiments, each of trusted third party system 110, the first participating system 120, the second participating system 140, and the third participating systems 150 may be associated with a different entity. For example, in some embodiments, the first participating system 120 may be associated with a first bank. In these and other embodiments, the second participating system 140 may be associated with a second bank. In these and other embodiments, the third participating system 150 may be associated with a third bank. In these and other embodiments, the trusted third party system 110 may be associated with a company. In some embodiments, the company, as the trusted third party system 110, may set up or operate a blockchain 180. In these and other embodiments, the unauthorized system 160 may be a participant in the blockchain 180 but may not be participating in a particular transaction between the first participating party 120, the second participating company 140, and the third participating company 150.

Alternatively or additionally, in some embodiments the first participating system 120 may be associated with a first company. In these and other embodiments, the second participating system 140 may be associated with a second bank. In these and other embodiments, the third participating system 150 may be associated with a third company. In these and other embodiments, the trusted third party system 110 may be associated with a bank. In some embodiments, the bank, as the trusted third party system 110, may set up a blockchain 180. In these and other embodiments, the blockchain 180 may have more participants than the first participating system 120, the second participating system 140, and the third participating system 150.

Alternatively or additionally, in some embodiments, any of the trusted third party system 110, the first participating system 120, the second participating system 140, and the third participating system 150 may be associated with individuals. For example, in some embodiments, the first participating system 120 may be associated with a company, the second participating system 140 may be associated with an individual, and the third participating system 150 may be associated with a bank.

The participating systems 120, 140, and 150 may be communicatively coupled to each other and to the trusted third party system 110 via the network 170. In some embodiments, each of the participating systems 120, 140, and 150 may obtain a common reference string 114 using distributed or multiparty computation. For example, each of the participating systems 120, 140, and 150 may jointly generate the common reference string 114. The common reference string may be used to generate proofs regarding the equivalency of encrypted messages. Alternatively or additionally, in some embodiments, each of the participating systems 120, 140, and 150 may obtain the common reference string 114 from the trusted third party system 110. In these and other embodiments, the trusted third party system 110 may be a system of a party that each of the participating systems 120, 140, and 150 trusts to not collude with any of the participating systems 120, 140, and 150.

In some embodiments, the common reference string 114 may include a string taken from a predetermined distribution. For example, in some embodiments, the common reference string 114 may be sampled from the uniform distribution. In these and other embodiments, the common reference string 114 may serve as a common source of randomness. In some embodiments, the first participating system 120, the second participating system 140, and the third participating system 150 may each have access to the common reference string 114. Alternatively or additionally, in some embodiments, the participating systems 120, 140, and 150 and the trusted third party system 110 may each have access to the common reference string 114. Alternatively or additionally, in some embodiments, each member of the blockchain 180 may have access to the common reference string 114. In these and other embodiments, the common reference string 114 may be generated by the trusted third party system 110. For example, the trusted third party system 110 may sample a public distribution to generate the common reference string 114. Alternatively or additionally, in some embodiments, distributed computation may be used to generate the common reference string 114. In some embodiments, the manner of sampling to generate the common reference string 114 and the public distribution for the common reference string 114 may be determined by a protocol related to a proof system. For example, a non-interactive zero knowledge proof may use a particular manner of sampling and a particular distribution to generate a common reference string 114. Alternatively or additionally, the common reference string 114 may be selected based on a particular distribution specified by a protocol of the participating parties. In these and other embodiments, the common reference string 114 may be generated and made available to the participating parties prior to the encryption of messages.

Each of the participating systems 120, 140, and 150 may be configured to generate a public encryption key/secret encryption key pair. As such, in some embodiments, each of the participating systems 120, 140, and 150 may have a corresponding public encryption key and secret encryption key associated therewith. For example, the first participating system 120 may have a public encryption key 124 and a corresponding secret encryption key 126 associated therewith; the second participating system 140 may have a public encryption key 144 and a corresponding secret encryption key 146 associated therewith; and the third participating system 150 may have a public encryption key 154 and a secret encryption key 156 associated therewith.

In some embodiments, the encryption keys may be generated based on an elliptic curve pairing group, for example an elliptic curve pairing group recommended by the National Institute of Standards and Technology (NIST). For example, the elliptic curve may be curve P-521, curve P-384, curve P-256, or any other elliptic curve. Each of the participating systems 120, 140, and 150 may use the same elliptic curve pairing group to generate encryption keys. Alternatively or additionally, in some embodiments, pairing groups other than elliptic curves may be used to generate encryption keys.

In some embodiments, the participating systems 120, 140, and 150 may jointly select a pairing group to use for the generation of the encryption keys. Alternatively or additionally, in some embodiments, the trusted third party system 110 may select a pairing group and provide the pairing group to the participating systems 120, 140, and 150 to use for the generation of the encryption keys.

One of the participating systems may obtain a message. For example, the first participating system 120 may obtain a message 128. The message 128 may be any message or data. For example, in some embodiments the participating systems 120, 140, and 150 may be systems of participants to a transaction such as a confidential financial transaction. In these and other embodiments, the message 128 may be related to the financial transaction between the participating systems 120, 140, and 150. For example, the message 128 may contain details related to price, quantity, products, rights, or any other details of the financial transaction.

The first participating system 120 may perform operations that allow for the second and third participating systems 140 and 150 to receive the message 128 in a secure manner (e.g., via encryption) that also allows others to verify that the message 128 is received by each of the second and third participating systems 140 and 150 without requiring decryption. For example, the first participating system 120 may obtain the public encryption keys 144 and 154 for the second participating system 140 and the third participating system 150, respectively. The first participating system 120 may be configured to generate a first encrypted message 130 of the message 128 using the public encryption key 144 of the second participating system 140. The first participating system 120 may also be configured to generate a second encrypted message 132 of the message 128 using the public encryption key 154 of the third participating system 150. An encrypted message may be generated using a public encryption key and a random generator. In these and other embodiments, the first encrypted message 130 and the second encrypted message 132 may be secure against chosen plaintext attacks.

The first participating system 120 may also be configured to generate a proof 134. The proof 134 may be generated using the message 128, the first encrypted message 130, the second encrypted message 132, the public key 144, the public key 154, and the common reference string 114. The proof 134 may be configured to be used in combination with the first encrypted message 130 and the second encrypted message 132 to verify that the same message 128 was used to generate each of the encrypted messages 130 and 132 without decrypting the first encrypted message 130 and without decrypting the second encrypted message 132. In some embodiments, the proof 134 may be a non-interactive zero knowledge (NIZK) proof. For example, in some embodiments, the proof 134 may be a Groth-Sahai NIZK proof.

The second participating system 140 and the third participating system 150 may be configured to obtain the encrypted messages 130 and 132 and the proof 134. In some embodiments, the second participating system 140 and the third participating system 150 may obtain the first and second encrypted messages 130 and 132 and the proof 134 from the first participating system 120. The second participating system 140 may be configured to decrypt the first encrypted message 130 into the message 128 using the secret encryption key 146. The third participating system 150 may be configured to decrypt the second encrypted message 132 into the message 128 using the secret encryption key 156.

In some embodiments, both the second participating system 140 and the third participating system 150 may be configured to use the proof 134 along with the first and second encrypted messages 130 and 132 and the common reference string 114 to determine that both the first and second encrypted messages 130 and 132 correspond to the same message 128. In these and other embodiments, the second participating system 140 and the third participating system 150 may be configured to determine that the first encrypted message 130 decrypts to the message 128 without decrypting the first encrypted message 130 and to determine that the second encrypted message 132 decrypts to the message 128 without decrypting the second encrypted message 132. In these and other embodiments, an encrypted message decrypting to another message or similar language may include that the result of executing a decryption function on an encrypted message using an appropriate encryption key may include the message.

In some embodiments, the environment 100 may include an unauthorized system 160. The unauthorized system 160 may be communicatively coupled with the trusted third party system 110 and the participating systems 120, 140, and 150 via the network 170. In some embodiments, the unauthorized system 160 may be configured to verify that the encrypted messages 130 and 132 correspond to the same message 128 using the proof 134 and the common reference string 114 without decrypting the first encrypted message 130 and without decrypting the second encrypted message 132. However, the unauthorized system 160 may not be able to determine the contents of the message 128 corresponding to the encrypted messages 130 and 132. In some embodiments, the unauthorized system 160 may be a system of a party that is attempting to surreptitiously view the confidential information from the first participating system 120. While the unauthorized system 160 may be able to verify that the first encrypted message 130 decrypts to the message 128 and that the second encrypted message 132 decrypts to the message 128, the unauthorized system 160 may not be able to determine the contents of the message 128.

In some embodiments, the environment 100 may include a trusted third party system 110. The trusted third party system 110 may include a computing system 112 configured to perform the operations described below. The trusted third party system 110 may be communicatively coupled to the first participating system 120, the second participating system 140, and the third participating system 150 via the network 170. In some embodiments, the trusted third party system 110 may be configured to generate a common reference string 114. In these and other embodiments, the common reference string 114 may be a Groth Sahai common reference string. The trusted third party system 110 may provide the participating systems 120, 140, and 150 with the common reference string 114. In some embodiments, the trusted third party system 110 may select a pairing group and may provide the pairing group to the participating systems 120, 140, and 150 so that the participating systems 120, 140, and 150 may use the pairing group to generate encryption keys.

In some embodiments, the trusted third party system 110 may generate a blockchain 180. Alternatively or additionally, the blockchain 180 may be unrelated to the trusted third party system 110. Each of the participating systems 120, 140, and 150 along with the unauthorized system 160 may be systems of parties participating in the blockchain 180. In these and other embodiments, the unauthorized system 160 may be a member of the blockchain 180 and may be able to view contents of blocks, such as the blocks 182, 184, 186, and 188 of the blockchain, but may not be a participant in a transaction between the first participating system 120, the second participating system 140, and the third participating system 150.

The blockchain 180 may be a distributed database with an ordered sequence of blocks. The blockchain 180 may include a first block 182, a second block 184, a third block 186, and a fourth block 188. Each block of the blockchain 180 may include a timestamp and a link to the previous block in the sequence. For example, the second block 184 may include a link to the first block 182, the third block 186 may include a link to the second block 184, and the fourth block 188 may include a link to the third block 186. In some embodiments, the blockchain 180 may be generated by the trusted third party system 110. Alternatively or additionally, the blockchain 180 may be managed by the trusted third party system 110. Alternatively or additionally, the blockchain 180 may be unrelated to the trusted third party system 110.

In some embodiments, each member of the blockchain 180 may obtain the common reference string 114 from the blockchain 180. Additionally or alternatively, each member of the blockchain 180 may obtain the same pairing group that is available to the first participating system 120, the second participating system 140, and the third participating system 150. For example, in some embodiments, the common reference string 114 and the pairing group may be posted to a block of the blockchain 180. In these and other embodiments, the common reference string 114 and the pairing group may be posted to the block 182 of the blockchain 180. Each of the members of the blockchain 180, including the first participating system 120, the second participating system 140, and the third participating system 150 may obtain the common reference string 114 and the pairing group from the block 182 of the blockchain 180.

In these and other embodiments, the first participating system 120 may post the first encrypted message 130 and the second encrypted message 132 along with the proof 134 on second block 184 of the blockchain 180. In these and other embodiments, the second participating system 140 and the third participating system 150 may obtain the first encrypted message 130, the second encrypted message 132, and the proof 134 from the second block 184 of the blockchain 180.

Modifications, additions, or omissions may be made to the environment 100 depicted in FIG. 1A without departing from the scope of the present disclosure. For example, in some embodiments, the environment 100 may not include the trusted third party system 110. Alternatively or additionally, in some embodiments, the environment 100 may not include the blockchain 180. Alternatively or additionally, in some embodiments, the environment 100 may not include the unauthorized system 160. While the environment 100 is depicted with three participating systems 120, 140, and 150, in some embodiments, the environment 100 may include more participating systems and correspondingly more encrypted messages, public encryption keys, and secret encryption keys. For example, if there are five participating systems, there may be four encrypted messages. The proof 134 may be configured to allow each of the participating systems to verify that each of the four encrypted messages decrypts to the same message 128. While the environment 100 is depicted with one unauthorized system 160, there may be many unauthorized systems. For example, five unauthorized systems may be participants in a blockchain 180 network and may not be participants in a transaction between the three participating systems 120, 140, and 150.

Figure 1B:
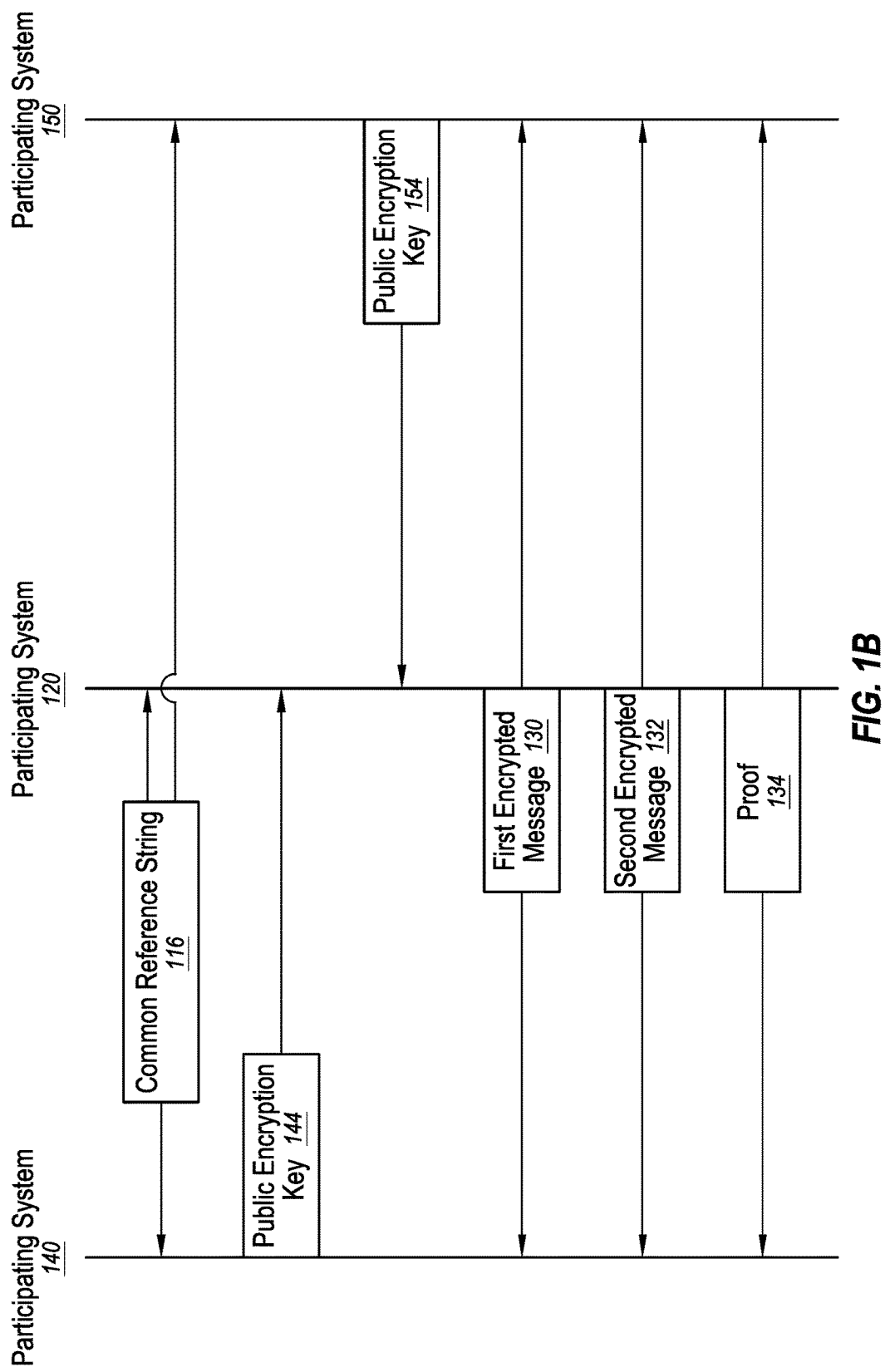
FIG. 1B illustrates an example flow of information related to authenticated broadcast encryption communication.

FIG. 1B illustrates an example flow of information between the first participating system 120, the second participating system 140, and the third participating system 150.

In some embodiments, the flow of information may begin with the first participating system 120, the second participating system 140, and the third participating system 150 obtaining the common reference string 114. In some embodiments, the common reference string 114 may be obtained through a distributed computation scheme of which the first participating system 120, the second participating system 140, and the third participating system 150 may participate. Additionally or alternatively, each of the participating systems 120, 140, and 150 may obtain the common reference string 114 from the trusted third party system 110.

The first participating system 120, the second participating system 140, and the third participating system 150 may each generate a public encryption key and a secret encryption key. For example, the first participating system 120 may generate the public encryption key 124 and the secret encryption key 126, the second participating system 140 may generate the public encryption key 144 and the secret encryption key 146, and the third participating system may generate the public encryption key 154 the secret encryption key 156.

The first participating system 120 may obtain a message 128. The first participating system 120 may also obtain the public encryption key 144 from the second participating system 140 and the public encryption key 154 from the third participating system 150. The first participating system 120 may use the public encryption key 144 to generate a first encrypted message 130 and may use the public encryption key 154 to generate a second encrypted message 132. The first participating system 120 may also generate a proof 134 using the common reference string 114, the first encrypted message 130, and the second encrypted message 132.

The second participating system 140 may obtain the first encrypted message 130, the second encrypted message 132, and the proof 134 from the first participating system 120. The second participating system 140 may verify that the first encrypted message 130 and the second encrypted message 132 decrypt to the same message without decrypting the second encrypted message 132 using the proof 134, the first and second encrypted messages 130 and 132, respectively, and the common reference string 114. The second participating system 140 may also decrypt the first encrypted message 130 using the secret encryption key 146.

The third participating system 150 may obtain the first encrypted message 130, the second encrypted message 132, and the proof 134 from the first participating system 120. The third participating system 150 may verify that the first encrypted message 130 and the second encrypted message 132 decrypt to the same message using the proof 134, the first and second encrypted messages 130 and 132, respectively, and the common reference string 114. The third participating system 150 may also decrypt the second encrypted message 132 using the secret encryption key 156.

Modifications, additions, or omissions may be made to the flow of information depicted in FIG. 1B without departing from the scope of the present disclosure. For example, in some embodiments, the flow of information may additionally include a trusted third party system 110. In these and other embodiments, the trusted third party system 110 may generate the common reference string 114 and may transmit the common reference string 114 to each of the first, second, and third participating systems 120, 140, and 150, respectively.

Alternatively or additionally, in some embodiments, the flow of information may additionally include a blockchain network 180. In these and other embodiments, the first participating system 120 may post the first and second encrypted messages 130 and 132, respectively, and the proof 134 to a block of the blockchain 180. In these and other embodiments, the second participating system 140 and the third participating system 150 may obtain the first and second encrypted messages 130 and 132, respectively, and the proof 134 from the blockchain 180.

Alternatively or additionally, in some embodiments, additional parties, such as an unauthorized system 160, may obtain the common reference string 114, the first encrypted message 130, the second encrypted message 132, and the proof 134. For example, in some embodiments, the unauthorized system 160 may participate in the generation of the common reference string 114. In these and other embodiments, the unauthorized system 160 may be a participant in the blockchain 180 but may not be a participant to the transaction between the first, second, and third participating systems 120, 140, and 150, respectively. In some embodiments, the unauthorized system 160 may be configured to use the first encrypted message 130, the second encrypted message 132, and the proof 134 to verify that the first encrypted message 130 and the second encrypted message 132 decrypt to equivalent messages without decrypting the first encrypted message 130 and without decrypting the second encrypted message 132. In these and other embodiments, the unauthorized system 160 may not be configured to decrypt the first encrypted message 130 and may not be configured to decrypt the second encrypted message 132. In these and other embodiments, the unauthorized system 160 may not be configured to obtain any information from the first encrypted message 130 or the second encrypted message 132 other than the equivalency of the decryption of the first encrypted message 130 and the decryption of the second encrypted message 132. In these and other embodiments, the unauthorized system may not be configured to obtain any of the contents of the message 128.

Figure 2:
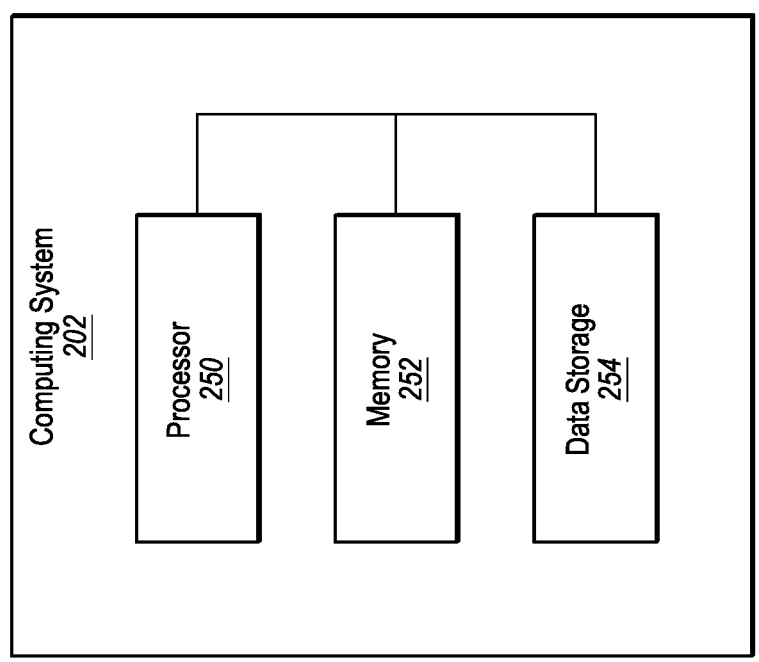
FIG. 2 illustrates an example computing system that may be configured to broadcast an encrypted message.

FIG. 2 illustrates a block diagram of an example computing system 202, according to at least one embodiment of the present disclosure. The computing system 202 may be configured to implement or direct one or more operations associated with authenticated broadcast encryption (e.g., the operations of the trusted third party system, the operations of encryption of the message, or the operations of the decryption and verification of the encrypted messages described above with respect to FIGS. 1A and 1B). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the encryption algorithm may be included in the data storage 254 as program instructions. The processor 250 may fetch the program instructions of the encryption algorithm from the data storage 254 and may load the program instructions of the encryption algorithm in the memory 252. After the program instructions of the encryption algorithm are loaded into memory 252, the processor 250 may execute the program instructions such that the computing system may implement the operations associated with the encryption algorithm as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
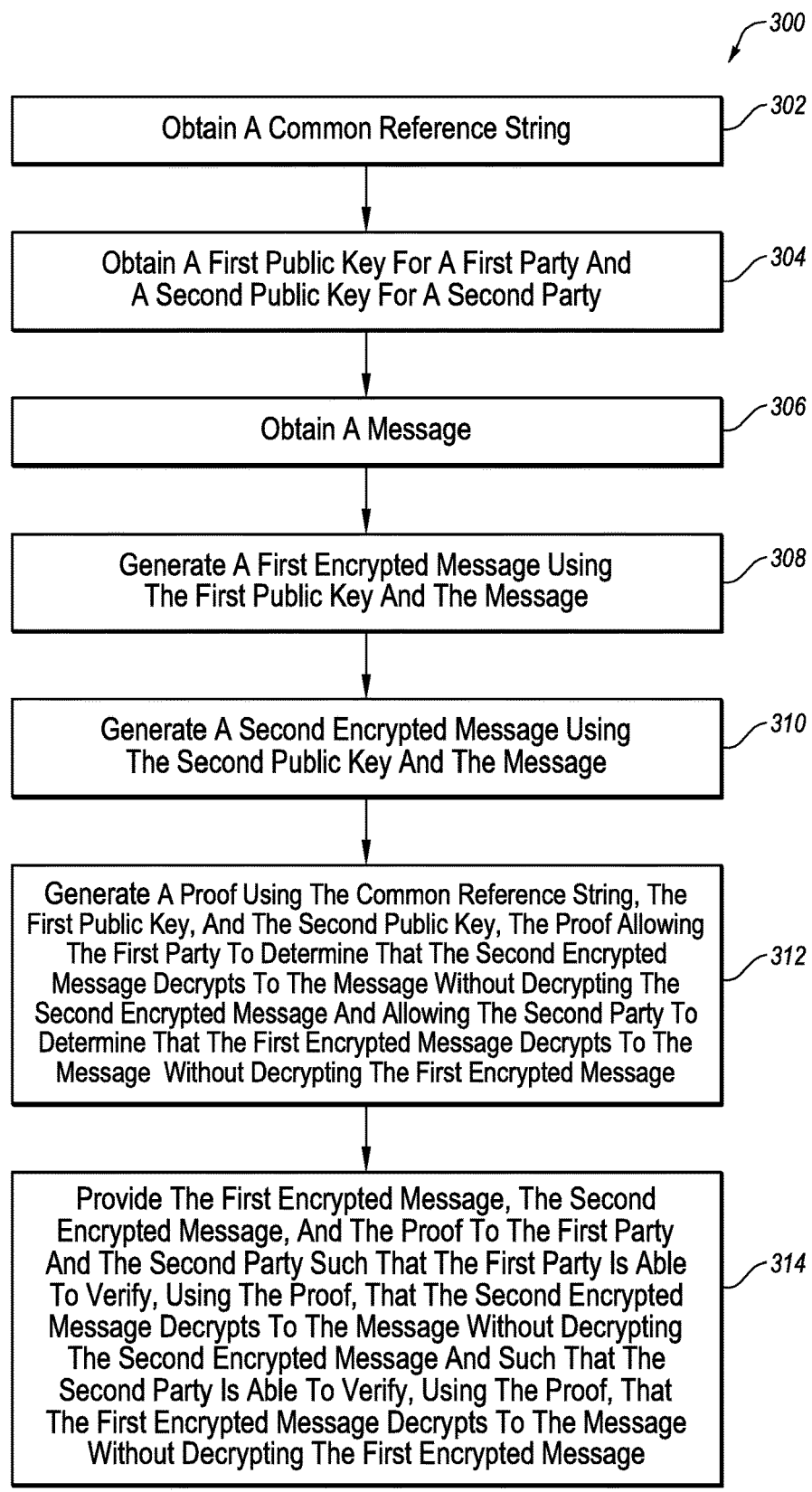
FIG. 3 depicts a flowchart of an example method of authenticated broadcast encryption for a participating encryption system.

FIG. 3 is a flowchart of an example computer-implemented method to encrypt a message. The method 300 may be arranged in accordance with at least one embodiment described in the present disclosure. The method 300 may be performed, in whole or in part, in some embodiments by a system and/or environment, such as the environment 100 and/or the computing system 200 of FIGS. 1 and 2, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where a common reference string may be obtained. In some embodiments, the common reference string may be obtained using distributed computation between a first participating system of a first party, a second participating system of a second party, and a third participating system. In some embodiments, the common reference string may be obtained from a trusted third party system.

In block 304, a first public key for the first party and a second public key for the second party may be obtained. In block 306, a message may be obtained. In some embodiments, the message may include a financial transaction.

In block 308, a first encrypted message may be generated using the first public key and the message. In block 310, a second encrypted message may be generated using the second public key and the message. In some embodiments, the first encrypted message and the second encrypted message may be secure against chosen plaintext attacks.

In block 312, a proof may be generated using the common reference string, the first public key, and the second public key, the proof allowing the first party to determine that the second encrypted message decrypts to the message without decrypting the second encrypted message and allowing the second party to determine that the first encrypted message decrypts to the message without decrypting the first encrypted message.

In block 314, the first encrypted message, the second encrypted message, and the proof may be provided to the first party and the second party such that the first party is able to verify, using the proof, that the second encrypted message decrypts to the message without decrypting the second encrypted message and such that the second party is able to verify, using the proof, that the first encrypted message decrypts to the message without decrypting the first encrypted message. In some embodiments, providing the first encrypted message, the second encrypted message, and the proof to the first party and to the second party may include posting the first encrypted message, the second encrypted message, and the proof to a blockchain. In some embodiments, the proof may allow one or more members of the blockchain in addition to the first party and the second party to determine that the first encrypted message and the second encrypted message decrypt to equivalent messages without decrypting the first encrypted message and without decrypting the second encrypted message One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 300 may further include providing the first encrypted message, the second encrypted message, and the proof to a third party such that the third party is able to verify, using the proof, that the first encrypted message and the second encrypted message decrypt to equivalent messages without decrypting the first encrypted message and without decrypting the second encrypted message.

Figure 4:
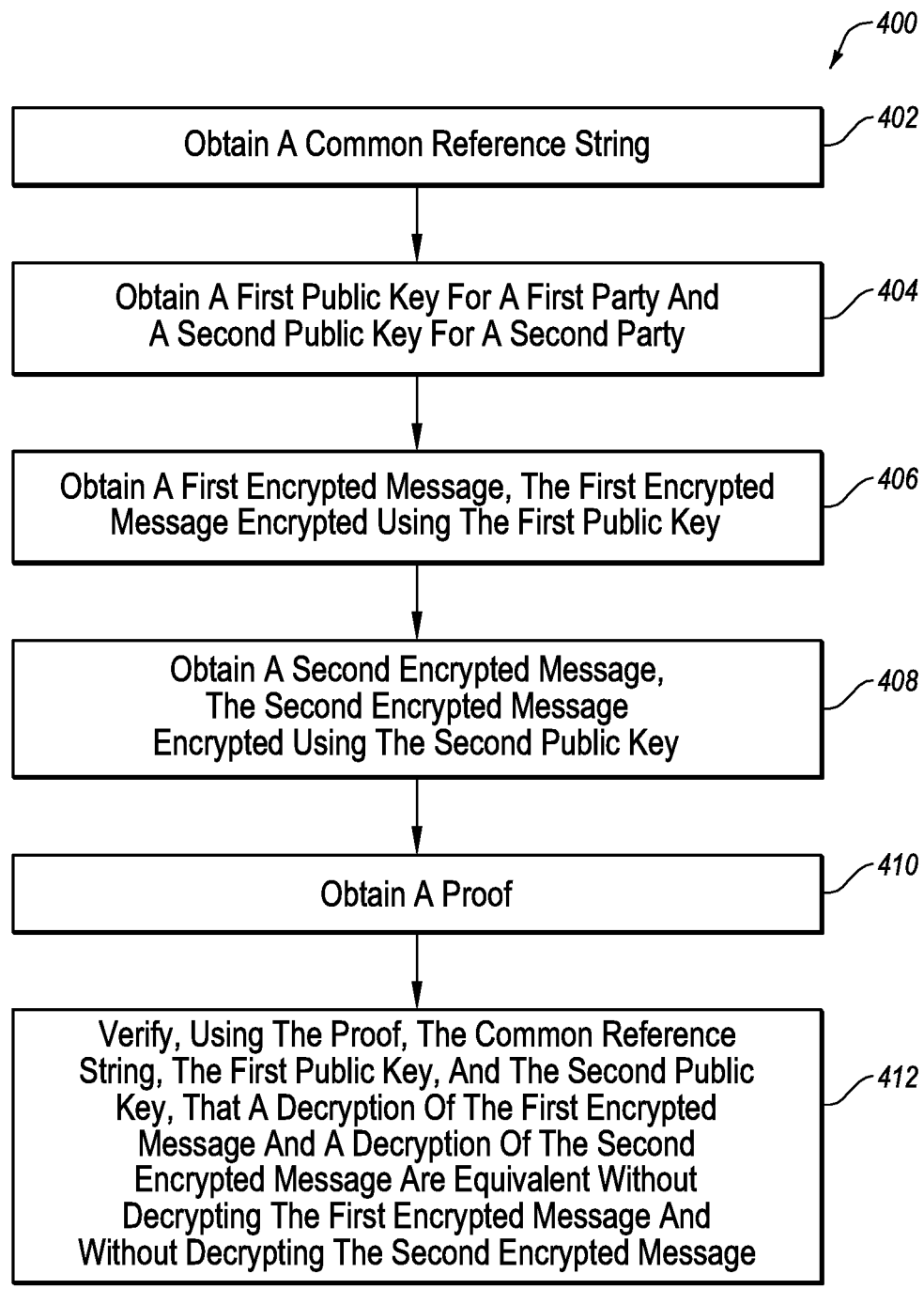
FIG. 4 depicts a flowchart of an example method of authenticated broadcast encryption for a participating decryption system.

FIG. 4 is a flowchart of an example computer-implemented method to verify an encrypted message. The method 400 may be arranged in accordance with at least one embodiment described in the present disclosure. The method 400 may be performed, in whole or in part, in some embodiments by a system and/or environment, such as the environment 100 and/or the computing system 200 of FIGS. 1 and 2, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a common reference string may be obtained. In some embodiments, the common reference string may be obtained using distributed computation between a first participating system of a first party, a second participating system of a second party, and a third participating system. In some embodiments, the common reference string may be obtained from a trusted third party system.

In block 404, a first public key for the first party and a second public key for the second party may be obtained. In block 406, a first encrypted message may be obtained. The first encrypted message may be encrypted using the first public key. In block 408, a second encrypted message may be obtained. The second encrypted message may be encrypted using the second public key. In some embodiments, the first encrypted message and the second encrypted message may be secure against chosen plaintext attacks. In block 410, a proof may be obtained. In some embodiments, the first encrypted message, the second encrypted message, and the proof may be obtained from a blockchain.

In block 412, a decryption of the first encrypted message and a decryption of the second encrypted message may be verified as equivalent without decrypting the first encrypted message and without decrypting the second encrypted message using the proof, the common reference string, the first public key, and the second public key.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the method 400 may further include decrypting the first encrypted message using a first secret key.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A computer-implemented method to encrypt a message, the method comprising:
    obtaining a common reference string;
    obtaining a first public key for a first party and a second public key for a second party;
    obtaining a message;
    generating a first encrypted message using the first public key and the message;
    generating a second encrypted message using the second public key and the message;
    generating a proof using the common reference string, the first public key, and the second public key, the proof allowing the first party to determine that the second encrypted message decrypts to the message without decrypting the second encrypted message and allowing the second party to determine that the first encrypted message decrypts to the message without decrypting the first encrypted message; and
    providing the first encrypted message, the second encrypted message, and the proof to the first party and the second party, wherein the first party is able to verify, using the proof, that the second encrypted message decrypts to the message without decrypting the second encrypted message and the second party is able to verify, using the proof, that the first encrypted message decrypts to the message without decrypting the first encrypted message.

2. The method of claim 1, wherein the common reference string is obtained using distributed computation between a first participating system of the first party, a second participating system of the second party, and a third participating system.

3. The method of claim 1, wherein the common reference string is obtained from a trusted third party system.

4. The method of claim 1, further comprising providing the first encrypted message, the second encrypted message, and the proof to a third party such that the third party is able to verify, using the proof, that the first encrypted message and the second encrypted message decrypt to equivalent messages without decrypting the first encrypted message and without decrypting the second encrypted message.

5. The method of claim 1, wherein providing the first encrypted message, the second encrypted message, and the proof to the first party and to the second party comprises posting the first encrypted message, the second encrypted message, and the proof to a blockchain.

6. The method of claim 5, wherein the proof allows one or more members of the blockchain in addition to the first party and the second party to determine that the first encrypted message and the second encrypted message decrypt to equivalent messages without decrypting the first encrypted message and without decrypting the second encrypted message.

7. The method of claim 1, wherein the message includes a financial transaction.

8. The method of claim 1, wherein the first and second encrypted messages are secure against chosen plaintext attacks.

9. A computer-implemented method to verify an encrypted message, the method comprising:
    obtaining a common reference string;
    obtaining a first public key for a first party and a second public key for a second party;
    obtaining a first encrypted message, the first encrypted message encrypted using the first public key;
    obtaining a second encrypted message, the second encrypted message encrypted using the second public key;
    obtaining a proof, the proof allowing the first party to determine whether the first encrypted message and the second encrypted message decrypt to a same message; and
    verifying, using the proof, the common reference string, the first public key, and the second public key, that a decryption of the first encrypted message and a decryption of the second encrypted message are equivalent without decrypting the first encrypted message and without decrypting the second encrypted message.

10. The method of claim 9, wherein the common reference string is obtained using distributed computation between a first participating system of the first party, a second participating system of the second party, and a third participating system.

11. The method of claim 9, wherein the common reference string is obtained from a trusted third party system.

12. The method of claim 9, wherein the first encrypted message, the second encrypted message, and the proof are obtained from a blockchain.

13. The method of claim 9, further comprising decrypting the first encrypted message using a first secret key.

14. The method of claim 9, wherein the first and second encrypted messages are secure against chosen plaintext attacks.

15. A system to encrypt a message, the system comprising:
    one or more processors, the one or more processors configured to:
    obtain a common reference string;
    obtain a first public key for a first party and a second public key for a second party;
    obtain a message;
    generate a first encrypted message using the first public key and the message;
    generate a second encrypted message using the second public key and the message;
    generate a proof using the common reference string, the first public key, and the second public key, the proof allowing the first party to determine that the second encrypted message decrypts to the message without decrypting the second encrypted message and allowing the second party to determine that the first encrypted message decrypts to the message without decrypting the first encrypted message; and
    provide the first encrypted message, the second encrypted message, and the proof to the first party and the second party, wherein the first party is able to verify, using the proof, that the second encrypted message decrypts to the message without decrypting the second encrypted message and the second party is able to verify, using the proof, that the first encrypted message decrypts to the message without decrypting the first encrypted message.

16. The system of claim 15, wherein the one or more processors are further configured to provide the first encrypted message, the second encrypted message, and the proof to a third party such that the third is able to verify, using the proof, that the first encrypted message and the second encrypted message decrypt to equivalent messages without decrypting the first encrypted message and without decrypting the second encrypted message.

17. The method of claim 16, wherein providing the first encrypted message, the second encrypted message, and the proof to the third party comprises posting the first encrypted message, the second encrypted message, and the proof to a blockchain.

18. The system of claim 15, wherein the common reference string is obtained using distributed computation.

19. The system of claim 15, wherein the common reference string is obtained from a trusted third party system.

20. The system of claim 15, wherein the first and second encrypted messages are secure against chosen plaintext attacks.

\* \* \* \* \*